US006218488B1

(12) United States Patent
Schiffino et al.

(10) Patent No.: US 6,218,488 B1
(45) Date of Patent: Apr. 17, 2001

(54) POLYMERIZATION PROCESS FOR OLEFIN COPOLYMERS USING BRIDGED HAFNOCENE COMPOUNDS

(75) Inventors: Rinaldo S. Schiffino, Wilmington, DE (US); Donna J. Crowther, Baytown, TX (US); Bernard J. Folie, Saint Genese (BE); John F. Walzer, Jr., Seabrook, TX (US)

(73) Assignee: Exxon Mobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 09/263,510

(22) Filed: Mar. 4, 1999

Related U.S. Application Data

(60) Provisional application No. 60/076,712, filed on Mar. 4, 1998, provisional application No. 60/076,841, filed on Mar. 4, 1998, provisional application No. 60/087,445, filed on Jun. 1, 1998, provisional application No. 60/087,447, filed on Jun. 1, 1998, and provisional application No. 60/087,446, filed on Jun. 1, 1998.

(51) Int. Cl.$^7$ .................................................. C08F 4/52
(52) U.S. Cl. .......................... 526/133; 526/134; 526/351; 526/348.6; 526/160; 526/943; 526/916; 502/104; 502/203
(58) Field of Search .................. 526/348.6, 351, 526/352, 943, 160, 133, 134, 916

(56) References Cited

U.S. PATENT DOCUMENTS

| | | | |
|---|---|---|---|
| 5,132,381 | 7/1992 | Winter et al. | 526/160 |
| 5,155,080 | 10/1992 | Elder et al. | 502/152 |
| 5,198,401 | 3/1993 | Turner et al. | 502/155 |
| 5,229,478 | 7/1993 | Floyd et al. | 526/160 |
| 5,296,433 | 3/1994 | Siedle et al. | 502/117 |
| 5,408,017 | 4/1995 | Turner et al. | 526/134 |
| 5,710,224 | 1/1998 | Alt et al. | 526/160 |
| 5,783,512 | * 7/1998 | Jacobsen et al. | 502/124 |
| 5,801,113 | * 9/1998 | Jejelowo et al. | 502/104 |

FOREIGN PATENT DOCUMENTS

| | | |
|---|---|---|
| 2017190 | 11/1990 | (CA) . |
| 2133181 | 3/1995 | (CA) . |
| 0 284 708 A1 | 9/1987 | (EP) . |
| 0 284 708 B1 | 9/1987 | (EP) . |
| 0 277 004 | 8/1988 | (EP) . |
| 0 316 155 A2 | 11/1988 | (EP) . |
| 0 399 348 A2 | 5/1990 | (EP) . |
| 0 407 870 A2 | 7/1990 | (EP) . |
| 0 516 018 A2 | 5/1992 | (EP) . |
| 0 612 769 A1 | 2/1994 | (EP) . |
| 0 612 768 | 8/1994 | (EP) . |
| 0 645 401 A1 | 9/1994 | (EP) . |
| 0 666 267 A2 | 12/1994 | (EP) . |
| 0 824 113 A1 | 2/1998 | (EP) . |
| 10060034 | 3/1998 | (JP) . |
| WO 92/15596 | 9/1992 | (WO) . |
| WO 96/28480 | 9/1996 | (WO) . |
| WO 96/33227 | 10/1996 | (WO) . |
| WO 97/14698 | 4/1997 | (WO) . |
| WO 97/19959 | 6/1997 | (WO) . |
| WO 97/22635 | 6/1997 | (WO) . |
| WO 97/29845 | 8/1997 | (WO) . |
| WO 99/06412 | 2/1999 | (WO) . |

OTHER PUBLICATIONS

"Crystal Structures And Stereospecific Propylene Polymerizations With Chiral Hafnium Metallocene Catalysts," Ewen, et al, J. Am. Chem. Soc., vol. 109, p. 6544–6545 (1987).

"Silolene–Bridged Zirconocenium Polymerization Catalysts," Woei Tsai, et al, J. of Poly..Sci.: Part A: Poly. Chem., vol. 32, pp. 149–158 (1994).

"Stereoselective Synthesis of a Germanium–Bridged Zirconocene for Temperature–Invariant Porpylene Polymerizations," You–Xian Chen, et al, Organometallics, vol. 13, p. 748–749, (1994).

"New *ansa*–Metallocenes of the Group 4 Transition Metals as Homogeneous Catalysts for the Polymerization of Propene and Styrene," Malcolm L.H. Green, et al, J. Chem. Soc. Dalton Trans., Issue I, pp. 657–665, (1994).

"(1,3–Propanediyl) silylene–bis(1–indenyl) dichlorozirconium. Synthesis and polymerization catalysis," You–Xian chen, et al, J. of Organometallic Chem., vol. 487, p. 29–34, (1995).

"Synthesis and characterization of *ansa*–[1,1–bis(inden–1, 1–diyl)–1–silacyclopentane]zirconium dichlorides. Crystal structures of *meso*–and *racemic*–[1,1–bis[inden–1, 1–diyl)–1–silacyclopentane] –dichloro zirconium and *racemic*–[1,1–bis(4,5,6,7–tetrahydroinden–1, 1–diyl)–1–sila–cylopentane] dichlorozirconium," Hendrik J.G. Luttikhedde, et al, J. of Organometallic Chem., vol. 486, p. 193–198, (1995).

(List continued on next page.)

Primary Examiner—David W. Wu
Assistant Examiner—R. Harlan
(74) *Attorney, Agent, or Firm*—William G. Muller; Charles E. Runyan

(57) ABSTRACT

The invention is a polymerization process for ethylene copolymers having a density less than 0.915 comprising contacting ethylene, one or more α-olefin monomer, and optionally one or more diene monomer, with a catalyst composition comprising the reaction product of at least one organometallic Group 4 metallocene compound derived from a bridged, fused-ring ligand containing biscyclopentadienyl hafnocene, said bridge being a substituted or unsubstituted carbon or silicon atom connecting the biscyclopentadienyl ligands, and a salt of a Group 13 element anionic complex having halogenated aromatic ligands in an essentially tetrahedral structure wherein the aromatic groups are polycyclic fused or pendant aromatic rings. The process is particularly suitable for the preparation of high comonomer content and high molecular weight ethylene-α-olefin plastomers and ethylene-propylene or ethylene-propylene-diene monomer elastomers.

19 Claims, No Drawings

OTHER PUBLICATIONS

"Preparation and X–ray structure of a novel chiral methylene bridged titanocene complex," Christopher A. Willoughby, et al, J. of Organometallic Chem., vol. 497, p. 11–15, (1995).

"Constrained Geometry" Dialkyl Catalysts. Efficient Syntheses, C–H Bond Activation Chemistry, Monomer–Dimer Equilibration, and α–Olefin Polymerization Catalysis, You–Xian Chen, et al, Organometallics, vol. 16, p. 3649–3657, (1997).

"Synthesis of Polysilanes using Group IV Metallocene based Catalysts and unusual Boron based Co–Catalysts", Newton, et al, Polymer Preprints (ACS, Div. Polym. Chem), vol. 39 No. 1, p. 587–588, (1988).

"Acentric Self–Assembly Of An AZO Polymer Through Layer–By–Layer Deposition," Srinivasan Balasubramanian, et al, Dept. of Chem. And Physics, Univ. of MA Lowell, p. 502–503.

* cited by examiner

POLYMERIZATION PROCESS FOR OLEFIN COPOLYMERS USING BRIDGED HAFNOCENE COMPOUNDS

CROSS-REFERENCE TO RELATED APPLICATIONS

This application claims benefit to U.S. Provisional applications U.S. Ser. Nos. 60/076,712, filed Mar. 4, 1998, 60/076,841, filed Mar. 4, 1998, 60/087,445, filed Jun. 1, 1998, 60/087,447 filed Jun. 1, 1998 and 60/087,446, filed Jun. 1, 1998, the disclosures of which are incorporated by reference.

FIELD OF THE INVENTION

This invention relates to the preparation of polyolefin polymers using ionic catalyst systems based on bridged hafnocene compounds activated by ionization and stabilized with non-coordinating anions.

BACKGROUND OF THE INVENTION

Ethylene copolymers make up a large segment of polyolefin polymers and are representative of the class. Such polymers range from crystalline polyethylene copolymers to largely amorphous elastomers, with a new area of semicrystalline "plastomers." In particular, ethylene-α-olefin and ethylene-α-olefin-diolefin elastomers are a well established class of industrial polymers having a variety of uses associated with their elastomeric properties, their thermo-oxidative stability, their solubility in hydrocarbon oleaginous fluids, and their ability to modify the properties of polyolefins. Included in this elastomer terminology are both EPM (ethylene-propylene copolymers) and EPDM (ethylene-propylene-diolefin terpolymers) rubber, both being vulcanizable by cross-linking, the addition of the diolefin providing increased ease of both cross-linking and functionalization. The vulcanized compounds are used in traditional thermoplastic applications when used with fillers, particularly in the automotive industry for such as belts, hoses and seals, in rubbery blends such as tire sidewall applications where they can be co-vulcanized with other rubbers, as roof coating materials, and in thermoplastic elastomeric alloys wherein the EPDM is dynamically vulcanized in a matrix of other thermoplastic polymer so as to create a dispersed phase of vulcanized elastomer in plastic. The rubbery characteristics of EPM and EPDM can provide toughening properties to any of a number of polar monomer based engineering thermoplastics, particularly when functionalized. Further the EPM and EPDM can both serve as effective viscosity modifiers for fuels and lubricating oils and can additionally provide dispersant and oxidative stabilizing characteristics for those oleaginous compounds when functionalized with polar functionalities including those based on amine and carboxylic acid moieties. Uses of the plastomers include general thermoplastic olefins, films, wire and cable coatings, polymer modification (by inclusion in blends with other polyolefins), injection molding, foams, footwear, sheeting, functionalized polymers (such as by free-radical graft addition of polar monomers) and components in adhesive and sealant compounds.

With the advent of metallocene catalysts, certain processes have become available for both EPM and EPDM. A bulk, or slurry, process utilizing supported, biscyclopentadienyl Group 4 metallocenes activated with alumoxane co-catalysts is bridged described as suitable for EPM and EPDM in U.S. Pat. No. 5,229,478. It is stated therein that prior art metallocene/alumoxane catalyst systems, directed to the preparation of ethylene-α-olefin elastomers, typically produce low molecular weight polymer not suited for use as a commercial elastomer. Thus advantages of higher molecular weight and high diene conversion rates are emphasized. The patented process utilizes metallocene compounds having alkyl, silanylene or silaalkylene bridged cyclopentadienyl ligands in a slurry of supported catalyst in liquid α-olefin. This process illustrates the use of support techniques and materials adding to the complexity and cost of the method for industrial use.

Catalysts comprised of metallocene cations and noncoordinating anions found to be suitable for the polymerization of ethylene copolymers are described in U.S. Pat. No. 5,198,401. Extensive description of noncoordinating anions is presented and Examples 29 through 33 address ethylene copolymer elastomers having varying molecular weights ($M_n$ from 21,000 to 317,000) and high α-olefin content (e.g., about 25 mol. % and about 65 wt %) using a catalyst based on bis(cyclopentadienyl) hafnium dimethyl at polymerization reaction temperatures of 50° C. In the related publication EP 0 277 004 hafnocenes activated with anion providing catalyst components are said to be preferred for high molecular weight products and for increased incorporation of olefins and diolefin comonomers with ethylene. Each describes a preferred noncoordinating anion tetra (pentaflourophenyl) boron, $[B(pfp)_4]^-$ or $[B(C_6F_5)_4]^-$, wherein the perfluorinated phenyl ligands on the boron makes the counterion labile and stable to potential adverse reactions with the metal cation complexes. Other aryl radicals are said to be suitable in addition to the phenyl radicals, napthyl and anthracyl are listed. U.S. Pat. No. 5,296,433 teaches the utility of borane complexes comprising tris (pentafluorophenyl)borane and specific complexing compounds. These complexes are said to allow higher molecular weight polymers when used with metallocenes for olefin polymerizaton due to increased solubility of the complexes in monomer or monomer solutions. WO 97/29845 describes the preparation of the organo-Lewis acid perfluorobiphenylborane, and its use to prepare and stabilize active, olefin polymerization catalysts. These cocatalysts are described as being less coordinating than tris (perfluorophenyl)boron, $B(C_6F_5)_3$, and thus capable of providing higher catalytic activities. Generic description of the suitable cocatalysts according to the application include those of the formula BR'R" where B is boron with R' and R" representing at least one and maybe more fluorinated biphenyls or other polycyclic groups, such as napthyl, anthryl or fluorenyl.

Processes for the preparation of syndiotactic polypropylene are addressed in U.S. Pat. Nos. 5,132,381 and 5,155,080. These patents address the use of asymmetric metallocenes for the sought stereospecificity. The latter addresses increased molecular weight and melting point syndiotactic polypropylene accessible with hafnocenes activated with methylalumoxane. Also, Ewen, et al, disclosed in J. Am. Chem. Soc., vol. 109, pp. 6544–6545 (1987) that rac-ethylene(bis(indenyl))hafnium dichloride provided higher molecular weight isotactic polypropylene than did the zirconium or titanium analogs.

High temperature processes for ethylene copolymers include those described in U.S. Pat. Nos. 5,408,017, WO 96/33227, WO 97/22635 and EP 0 612 768. Each describes metallocenes, including hafnocenes, that are said to be suitable for increasing molecular weight or catalyst activity, or both, used with noncoordinating anion cocatalyst components. High molecular weight ethylene/α-olefin copolymers is an objective of EP 0 612 768 and is addressed with catalyst systems based on bis(cyclopentadienyl/indenyl/fluorenyl) hafnocenes which are combined with an alkyl aluminum compound and an ionizing ionic compound providing a non-coordinating anion.

Improvement in catalyst activities so as to increase the yield of polymer for a given weight of catalyst compound, increasing molecular weight for high comonomer content ethylene copolymers, and maintaining both at temperatures generally in excess of room temperatures are recognized objectives for industrial processes.

INVENTION DISCLOSURE

Thus the invention is directed to an olefin polymerization process for ethylene copolymers having a density less than 0.915 comprising contacting ethylene, one or more α-olefin monomer, and optionally one or more diene monomer, with a catalyst composition comprising the reaction product of at least one organometallic Group 4 metallocene compound derived from a bridged, fused-ring ligand containing biscyclopentadienyl hafnocene, said bridge being a substituted or unsubstituted carbon or silicon atom connecting the biscyclopentadienyl ligands, and a salt of a Group 13 element anionic complex having halogenated aromatic ligands in an essentially tetrahedral structure wherein the aromatic groups are polycyclic fused or pendant aromatic rings. Increase in Mooney viscosities, indicative of high molecular weights, for ethylene copolymers over that of prior art polymers is exemplified.

BEST MODE AND EXAMPLES OF THE INVENTION

Ethylene copolymer elastomer, or rubber, of this invention (hereinafter referred to as "EPM and EPDM") is meant to include elastomeric copolymers, terpolymers, tetrapolymers, etc. It will comprise ethylene, one or more α-olefins, and optionally, one or more diene monomers; it will be substantially amorphous; and it will have a substantially random arrangement of at least the ethylene and the α-olefin monomers. Though focused on EPM and EPDM, the process will have utility for polyethylene copolymers (having ethylene and one or more comonomer such as described herein) having 10 to 20 mol % incorporation of the comonomers such that it is not strictly elastomeric as defined below but useful otherwise in the manner known in the art for such crystalline and semi-crystalline polymers. Typically the polyethylene copolymer plastomers will have a polymer density of about 0.87 to 0.93, while the elastomers generally will have even lower densities of from about 0.85 up to about 0.88.

The EPM and EPDM, capable of preparation in accordance with the invention process generally can have a molecular weight range typically between about 20,000 and up to about 500,000 or higher, more typically between about 40,000 and 300,000 where the molecular weight is number-average ("$M_n$").

Typically the EPM and EPDM are "substantially amorphous", and when that term is used to define the EPM and EPDM of this invention it is to be taken to mean having a degree of crystallinity less than about 25% as measured by means known in the art, preferably less than about 15%, and more preferably less than about 10%. The three major known methods of determining crystallinity are based on specific volume, x-ray diffraction, and infrared spectroscopy. Another well-established method, based on measurement of heat content as a function of temperature through the fusion range, is carried out using differential scanning calorimetric measurements. It is known that these independent techniques lead to reasonably good experimental agreement. The degree of randomness of the arrangement of monomers in the EPM and EPDM also affects the crystallinity and is appropriately characterized by the degree of crystallinity.

Additionally, it is known in the art that the tendency of a particular combination of catalyst system and monomers to produce blocky, random, or alternating polymers can be characterized by the product of the reactivity ratios defined for the given monomers under the specific reaction conditions encountered. If this product is equal to 1.0, the sequence distribution will be perfectly random; the more the product is greater than 1.0, the more the monomers will tend to have a "blocky" sequence distribution. Generally speaking, the segments of a polymer which crystallize are linear segments of a polymer which have a number of identical (both by chemical make-up and stereo-specific orientation) units in a row. Such segments are said to be "blocky". If there is little or no such sequential order within the segments making up a polymer chain, that chain will be very unlikely to conform itself into the correct shape to fit into the spatial order of a crystal and will accordingly exhibit a low degree of crystallinity. See, "Ethylene-Propylene Copolymers. Reactivity Ratios, Evaluation and Significance", C. Cozewith and G. Ver Strate, *Macromolecules*, Vol. 4, No. 4, 482–489 (1971). The EPM and EPDM of this invention accordingly can be characterized in one embodiment by the limitation that its method for preparation has a reactivity ratio product less than 2.0, preferably less than about 1.5, and more preferably less than about 1.25.

The ethylene copolymer plastomers of this invention include copolymers, terpolymers, tetrapolymers, etc. It will comprise ethylene and one or more α-olefins, preferably one of the $C_4$ to $C_{12}$ α-olefins; and it will have a substantially random arrangement of at the ethylene and the α-olefin monomers but will exhibit semi-crystalline characteristics, e.g., melting points ranging from about 85° C. to 115° C. The molecular weight (number-average molecular weight) of the plastomers of the invention will range from about 10,000 to about 60,000, preferably about 20,000 to about 50,000, particularly at or below about 45,000. The molecular weight for ethylene copolymer plastomers is more typically stated in terms of their polyethylene melt index (MI) (defined in ASTM 1238, Cond. E), those will typically range form 0.01 to 4.0, preferably 0.2 to 3.5, more preferably 0.03 to less than 3.5.

Exemplary α-olefins suitable for use in the preparation of the EPM and EPDM, and for the plastomers, are preferably $C_3$ to $C_{20}$ α-olefins. Illustrative non-limiting examples of such α-olefins are one or more of propylene, 1-butene, 1-pentene, 1-hexene, 1-octene, and 1-decene. The α-olefin content of the EPM and EPDM ranges depending upon selection of the specific α-olefin or α-olefins, being more for lower carbon number monomers, for example, about 25 to about 90 wt. %, preferably about 30 to about 80 wt. % for propylene; and, 5 to 35 mol. %, preferably 7.5 to 25 mol. % and most preferably 10 to 20 mol. % for 1-octene. The content of 1-butene and 1-hexene, if used, generally being within the limits described established for propylene and 1-octene. For the plastomers the range of comonomer incorporation will typically be in the range of between about 10 mol % to 40 mol %, preferably 10 to 25 mol %. Thus the density of the EPM and EPDM of the invention will range as described above and will typically be between 0.845 and 0.880, preferably 0.085 to 0.087. The density of the plastomers of the invention will range as described above and will typically be between 0.880 and 0.915, preferably above 0.890 to 0.910, and for specific embodiments 0.890 to 0.900.

The diene monomers, or diolefins, useful for EPM and EPDM in this invention include those typically used in known EPDM polymers. The typically used diene monomers are generally selected from the readily polymerizable non-conjugated dienes and can be straight chain, hydrocarbon diolefins or cycloalkenyl-substituted alkenes, having about 6 to about 15 carbon atoms, for example:

A. straight chain acyclic dienes such as 1,4-hexadiene and 1,6 octadiene.

B. branched chain acyclic dienes such as 5-methyl-1,4-hexadiene; 3,7-dimethyl-1,6-octadiene; 3,7-dimethyl-1,7-octadiene and the mixed isomers of dihydromyricene and dihydro-ocinene;

C. single ring alicyclic dienes such as 1,3-cyclopentadiene; 1,4-cyclohexadiene; 1,5-cyclooctadiene and 1,5-cyclododecadiene;

D. multi-ring alicyclic fused and bridged ring dienes such as tetrahydroindene, 5-methyl tetrahydroindene, dicyclopentadiene; bicyclo-(2,2,1)-hepta-2,5-diene; alkenyl, alklindene, cycloalkenyl and cycloalkylidene norbornenes such as 5-methylene-2-norbornene (MNB), 5-ethylidene-2-norbornene, 5-isopropylidene-2-norbornene, 5-(4-cyclopentenyl)-2-norbornene, 5-cyclohexylidene-2-norbornene, 5-vinyl-2-norbornene; and E. cycloalkenyl-substituted alkenes, such as allyl cyclohexene, vinyl cyclohexene, allyl cyclooctene, vinyl cyclooctene, allyl cyclodecene, vinyl cyclododecene.

Of these, the preferred dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene. It will be apparent that a mix of such dienes can also be utilized. The content of the optional diene monomer in the EPM and EPDM can be 0 to about 20 weight percent, and if used, preferably 0.5 to about 15 weight percent, and most preferably about 2.0 to about 12.0 weight percent. Surprisingly, diene incorporation greater than 5.0 wt %, even greater than either 8.0 wt. % or 10.0 wt. % is made possible using the process of this invention. The content of the optional diene monomer in the ethylene copolymer of the invention can range similarly as that for the EPM and EPDM, but will be preferably in the lower ranges, for example 0.1 to 8 mol. %.

Covalently bridged, fluorenyl-ligand containing hafnocene compounds of the invention are those hafnocenes having at least one unsubstituted or substituted fluorenyl ligand wherein each hydrogen of the atoms of either the 5-member or 6-member rings may be replaced with an R group that is, independently, a radical selected from $C_1$ to $C_{30}$ hydrocarbyl radicals. Essentially hydrocarbyl radicals are included, such will typically contain up to 30 carbon atoms but may be hetero-atom containing with not more than 1–3 non-hydrogen, non-carbon atoms, e.g., N, S, O, P, and Si. The covalent bridging group consists of a substituted or unsubstituted single carbon atom, i.e., a substituted or unsubstituted carbon atom (—$CH_2$—, or —CHR—, or —$CR_2$—) where each R may be the same or different $C_1$ to $C_{10}$ hydrocarbyl substitutent, or where the two R's may be covalently linked to form a cyclic structure. In a preferred embodiment at least one R group is aryl, e.g., phenyl, or is a further substituted phenyl, such as 3-methyl-phenyl or napthyl. Most preferably the covalently bridging group is methylphenylmethylene or dilphenylmethylene. In another preferred embodiment the bridge is cyclic, such as cyclobutyl and silacyclobutyl. Avoidance of excessive amounts of interfering organoaluminum compounds, due to Lewis acid-base interaction with the metallocene cations, is important to the advantages of this invention, thus the use of dihalide hafnocenes is avoided when such are to be added to the reaction process. The hafnocenes of this invention thus have labile ligands selected from the group consisting of dihydride, dialkyl, disilyl, and mixed labile ligands from this group, plus bidentate olefin ligands. Preferred labile ligands comprise $C_1$ to $C_8$ groups, preferably linear, and the single silicon atom analogs thereof, such as methyl-trimethylsilyl. These catalysts are preferred where amorphous ethylene copolymers, amoprhous polypropyene, polypropylene copolymers, syndiotactic polypropylene, and copolymers of other olefin monomers with propylene having syndiotactic polypropylene segments.

Examples of these asymmetrical, covalently bridged hafnocene compounds within the scope of the invention include dibutylmethyl (fluorenyl) (cyclopentadienyl) hafnium dimethyl, cyclobutyl (fluorenyl) (cyclopentadienyl) hafnium dimethyl, i-propyl (cyclopentadienyl) (fluorenyl) hafnium dimethyl, dinapthylmethylene (cyclopentadienyl) (fluorenyl) hafnium dimethyl, diphenylmethyl (cyclopentadienyl) (2,7-dimethyl fluorenyl) hafnium dimethyl, diphenylmethyl (cyclopentadienyl) (2,7-di-tertbutyl fluorenyl) hafnium dimethyl, methylene bis (fluorenyl) hafnium dimethyl, or methylphenylmethylene bis(fluorenyl) hafnium dimethyl.

Other stereorigid, bridged hafnocenes having fused-ring ligands such as fluorenyl and indenyl, are useful in accordance with the invention, particular where ethylene copolymers having isotactic isopropylene segments or isotactic polypropylene, and related isotactic polypropylene copolymers having 0–8 wt % ethylene, or $C_3$–$C_8$ α-olefins, are to prepared. Thus metallocene compounds for use to make isotactic or syndiotactic polypropylene, are well-known in the art and specific reference may be made to both patent literature and academic, see for example Journal of organometallic Chemistry 369, 359–370 (1989). Typically those catalysts are stereorigid symmetric chiral or asymmetric, bridged metallocenes. See, for example, U.S. Pat. No. 4,892,851, U.S. Pat. No. 5,017,714, U.S. Pat. No. 5,132,381, U.S. Pat. No. 5,296,434, U.S. Pat. No. 5,278,264, WO-A-(PCT/US92/10066) WO-A-93/19103, EP 0 577 581, EP 0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to in each. The hafnium versions of these Group 4 metallocenes are preferred catalyst precursor compounds in accordance with the invention. Dimethylsilyl(bisindenyl) hafnium dimethyl is exemplary. Preferred catalysts include biscyclopentadienyl hafnocenes that are stereorignid, chiral compound capable of making isotactic polypropylene.

The invention activating cocatalyst, precursor ionic compounds are typically salts comprising anionic Group 13 element complexes having four halogenated, aryl-substituted aromatic ligands. These invention aromatic ligands consist of polycyclic aromatic hydrocarbons and aromatic ring assemblies in which two or more rings (or fused ring systems) are joined directly to one another or together. These ligands, which may be the same or different, are covalently bonded directly to the metal/metalloid center. In a preferred embodiment the aryl groups of the halogenated tetraaryl Group 13 element anionic complex comprise at least one fused polycyclic aromatic hydrocarbon or pendant aromatic ring. Indenyl, napthyl, anthracyl, heptalenyl and biphenyl ligands are exemplary. The number of fused aromatic rings is unimportant so long as the ring junctions and especially the atom chosen as the point of connection to the Group 13 element center permit an essentially tetrahedral structure. Thus, for example, suitable ligands include those illustrated below. See the polycyclic compound examples in the literature for ligand selection, e.g., *Nomenclature of Organic Compounds,* Chs. 4–5 (ACS, 1974).

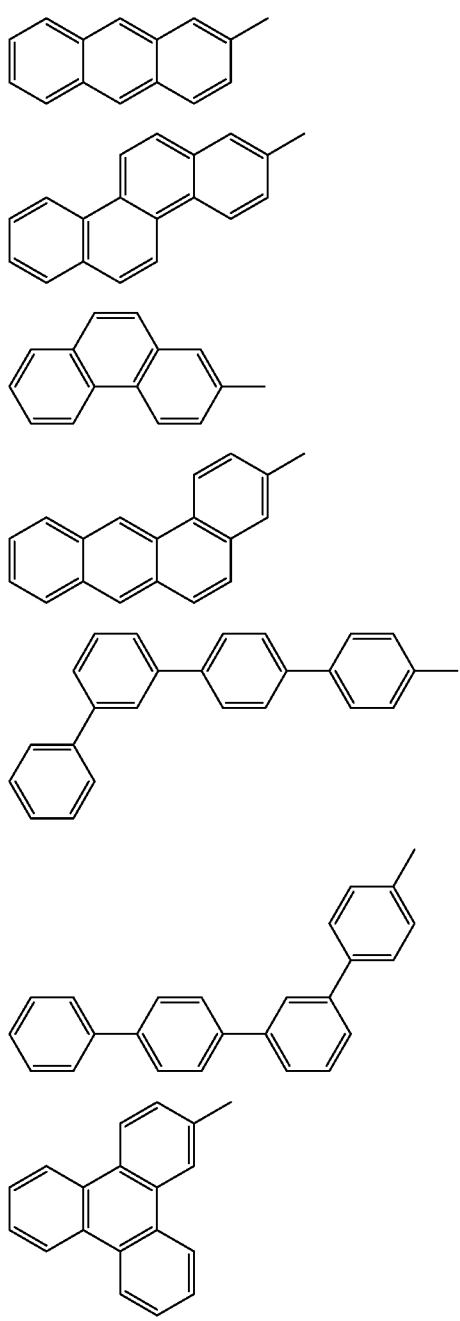

I

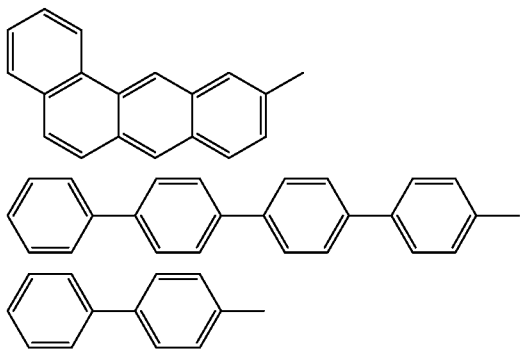

The choice of ligand connection point is particularly important. Substituents or ring junctions ortho to the ligand connection point present such steric bulk that adoption of an essentially tetrahedral geometry is largely precluded, and typically should be avoided, that is essentially absent except in mixed ligand systems. Examples of undesirable connection points, such as ortho substitutents or fused rings, are depicted below.

II

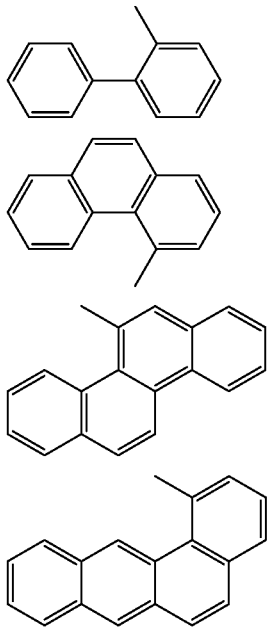

Suitable mixed-ligand Group 13 complexes can include fused rings or ring assemblies with ortho-substituents, or ring junctions, so long as those ligands do not exceed two in number. Thus Group 13 anions with one or two hindered fused ring aromatics with three or two unhindered ligands, where hindered aromatics are those having ortho-substituents or ring junctions (illustration II, above) and unhindered are those without (illustration I, above), will typically be suitable. Tris(perfluorophenyl) (perfluoroanthracyl) borate is an illustrative complex. In this complex the anthracyl ligand is a hindered fused ring having ortho-substituents but its use with three unhindered phenyl ligands allows the complex to adopt a tetrahedral structure. Thus, generically speaking, the Group 13 complexes useful in a accordance with the invention will typically conform to the following formula:

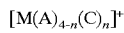

where, M is a Group 13 element, A is an unhindered ligand as described above, C is a hindered ligand as described above, and n=1,2.

The anions will be tetraaryl substituted, the aryl substitutents being at least partially halogenated, preferably fluorinated, and most preferably perfluorinated. Anions having trisaryl substituents and one alkyl group, or those tetraaryl groups not being at least partially halogenated, are subject to degradation with the strongly Lewis acidic metallocene cations of the invention, especially under the high temperature conditions, and can give rise to lower molecular weight copolymers and decreased catalyst efficiency. Additionally, halogenation inhibits reaction of the transition metal cation with any remaining carbon-hydrogen bonds of the aromatic rings, and perhalogenation precludes such potential undesirable reactions. Thus it is preferred that at least one third of hydrogen atoms on carbon atoms of the aryl-substituted aromatic ligands be replaced by halogen atoms, and thus it is more preferred that the aryl ligands be perhalogenated. Fluorine is the most preferred halogen.

Suitable cations for precursor salt compounds capable of providing the noncoordinating anions of the invention cocatalysts include those known in the art. Such include the nitrogen-containing cations such as those in U.S. Pat. No. 5,198,401 and WO 97/35983, the carbenium, oxonium or sulfonium cations of U.S. Pat. No. 5,387,568, metal cations, e.g., Ag+, the silylium cations of WO 96/08519, and the hydrated salts of Group 1 or 2 metal cations of WO 97/22635. Each of the documents of this paragraph are incorporated by reference for purposes of U.S. patent practice.

Examples of preferred precursor salts of the noncoordinating anions capable of ionic cationization of the metallocene compounds of the invention, and consequent stabilization with a resulting noncoordinating anion include trialkyl-substituted ammonium salts, where the alkyl groups may be the same or different $C_1$–$C_{20}$ hydrocarbyl group, preferably linear alkyl groups, such as triethylammonium tetrakis(perfluoronapthyl) or tetrakis(perfluoro-4-biphenyl)boron, tripropylammonium tetrakis(perfluoronapthyl) or tetrakis(perfluoro-4-biphenyl)boron, tri(n-butyl)ammonium tetrakis(perfluoronapthyl) or tetrakis(perfluoro-4-biphenyl)boron, trimethylammonium tetrakis(perfluoronapthyl) or tetrakis(perfluoro-4-biphenyl)boron, trimethylammonium tetra tetrakis(perfluoronapthyl) or tetrakis(perfluoro-4-biphenyl)boron, tributylammonium tetrakis (perfluoronapthyl) or tetrakis(perfluoro-4-biphenyl)boron, tripropylammonium tetrakis(perfluoronapthyl) or tetrakis (perfluoro-4-biphenyl), tributylammonium tetrakis (perfluoronapthyl) or tetrakis(perfluoro-4-biphenyl)boron, tributylammonium tetrakis(perfluoronapthyl) or tetrakis (perfluoro-4-biphenyl)boron, tributylammonium tetrakis (perfluoronapthyl) or tetrakis(perfluoro-4-biphenyl)boron, tri(n-butyl)ammonium tetrakis(perfluoronapthyl) or tetrakis (perfluoro4-biphenyl)boron and the like; N,N-dialkyl anilinium salts, the alkyl groups including those described above for the ammonium salts, such as N,N-dimethylanilinium tetrakis-(perfluoronapthyl) or tetrakis (perfluoro-4-biphenyl)boron, N,N-diethylanium tetrakis (perfluoronapthyl) or tetrakis(perfluoro-4-biphenyl)boron, N,N-2,4,6-pentamethylanilinium tetrakis(per-fluoronapthyl) or tetrakis(perfluoro-4-biphenyl)boron and the like; dialkyl ammonium salts such as di-(isopropyl)ammonium tetrakis (perfluoronapthyl) or tetrakis(perfluoro-4-biphenyl)boron, dicyclohexylammonium tetrakis(perfluoronapthyl) or tetrakis(perfluoro-4-biphenyl)boron and the like; and triaryl phosphonium salts such as triphenylphosphonium tetrakis (perfluoronapthyl) or tetrakis(perfluoro-4-biphenyl)boron, tri(methyl-phenyl)phosphonium tetrakis (perfluoronapthyl) or tetrakis(perfluoro-4biphenyl)boron, tri(dimethylphenyl) phosphonium tetrakis(perfluoronapthyl) or tetrakis (perfluoro4-biphenyl)boron and the like.

Further examples of suitable anionic precursors include those comprising a stable carbenium ion, and a compatible non-coordinating anion. These include tropillium tetrakis (perfluoronapthyl) or tetrakis(perfluoro-4-biphenyl) borate, triphenylmethylium tetrakis(perfluoronapthyl) or tetrakis (perfluoro-4-biphenyl) borate, benzene (diazonium) tetrakis (perfluoronapthyl) or tetrakis(perfluoro-4-biphenyl) borate, tropillium tetrakis(perfluoronapthyl) or tetrakis(perfluoro-4-biphenyl)borate, triphenylmethylium tetrakis (perfluoronapthyl) or tetrakis(perfluoro-4-biphenyl)borate, benzene (diazonium) tetrakis(perfluoronapthyl) or tetrakis (perfluoro-4-biphenyl) borate, tropillium tetrakis (perfluoronapthyl) or tetrakis(perfluoro-4-biphenyl)borate, triphenylmethylium tetrakis(perfluoronapthyl) or tetrakis (perfluoro-4-biphenyl)borate, benzene (diazonium) tetrakis (perfluoronapthyl) or tetrakis(perfluoro-4-biphenyl)borate. The essentially structurally equivalent silylium borate or aluminate salts are similarly suitable.

The term "scavenging compounds" as used in this application and in the claims is meant to include those compounds effective for removing polar impurities from the reaction solvent. Such impurities can be inadvertently introduced with any of the polymerization reaction components, particularly with solvent, monomer and catalyst feed, and adversely affects catalyst activity and stability. It can result in decreasing or even elimination of catalytic activity, particularly when a metallocene cation-noncoordinating anion pair is the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be required in the polymerization process itself.

Typically the scavenging compound will be an organometallic compound such as the Group-13 organometallic compounds of U.S. Pat. No. 5,241,025, EP-A-0 426 638, noted above, and those of WO 97/22635. Exemplary compounds include triethyl aluminum, triethyl borane, triisobutyl aluminum, methylalumoxane, isobutyl aluminumoxane, tri-n-hexyl aluminum and tri-n-octyl aluminum, those having bulky substituents covalently bound to the metal or metalloid center being preferred to minimize adverse interaction with the active catalyst. Addition of excess scavenger causes lower productivity, molecular weight and comonomer incorporation. The aluminum to hafnium molar ratios (Al:Hf) should accordingly be less than about 100:1, preferably less than about 75:1, more preferably less than about 50:1, and most preferably less than about 30:1. Molar ratios of less than 25:1 is especially preferred.

The polymerization process of the invention involves contacting the polymerizable monomers (ethylene, (α-olefin and, optionally diene monomer) in a single or multiphase solution or super-critical phase diluent with the described catalyst systems, at reaction temperatures of from about 30 to 210° C. and can be conducted in any known manner wherein inert supports are unnecessary. For example, in a solution process the reaction solvent can be provided to the reaction vessel after polymerizable monomer is introduced in either liquid, gas or solution form into that reaction solvent. A reaction medium is formed comprising the solvent within which the catalyst system and monomers are contacted for the polymerization reaction. Typically the scavenging compound is introduced into the reaction solvent to reduce or eliminate catalyst poisons introduced with any of the component elements of the reaction medium prior to introduction into the reactor, but is not contacted with the catalyst activator for sufficient time to have adverse effects on the effectiveness of that activator. Then the activator and metallocene compound can be contacted prior to addition to the polymerization reaction vessel or in the presence of the polymerizable monomers in the polymerization medium. Both pre-activation of the hafnocenes with the activator in the substantial absence of organoaluminum compound or in situ activation in the polymerization reaction where the limited amount of organoaluminum compounds may be present for poison scavenging, but significantly diluted by the polymerization medium, serve to inhibit adverse interactions with either of the activation compounds or the activated catalyst compounds.

In one embodiment the reaction is conducted under single or multiphase solution conditions at pressures from atmospheric to 500 psig (1–35 bar), preferably from 100 to 300 psig (8 to 21 bar) in a single continuous flow stirred tank reactor or multiple reactors in series. Preferred reaction temperatures are 40° C. and above, e.g., 40° C. to 140° C. Typically the polymerization reaction will be exothermic and the reactor will be chilled or cooled in accordance with known methods to assure that temperatures do not exceed those reasonably suitable for the polymer being produced.

A process especially suitable for the invention plastomers is high pressure, super critical polymerization, preferably employing less than 30 wt % of solvent, which is substantially adiabatic and where the heat of polymerization is accommodated by a rise in temperature of the reactor contents rather than by internal or external cooling. In this case, the reaction medium consists principally of unreacted monomer diluent. Such process may be performed, under a single or dual phase homogeneous conditions at pressures from 250 to 3000 bar, preferably from 500 to 2500 bar, with or without additional diluents or solvents at temperatures generally above the melting point of the polymer being produced, e.g., above about 150° C. Such processes are typically known and may include the use of scavenger compounds and catalyst deactivation or killing steps, see for example U.S. Pat. No. 5,408,017, WO 95/07941, and WO 92/14766. Each of these documents and their U.S. counterparts are incorporated by reference for purposes of U.S. patent practice. Preferred catalyst deactivators, or killers, include high molecular weight, non-recyclable compounds, such as polyvinyl-alcohol which exhibit the functional capacity to complex with the catalysts so as to deactivate them while not forming volatile polar by-products or residual unreacted compounds.

The process of the invention, as used for plastomers is also especially applicable to homogeneous single or multiphase solution polymerization which is substantially adiabatic that is to say the heat of polymerization is accommodated by a rise in temperature of the polymerization reactor contents, principally solvent. This adiabatic process typically would have no internal cooling and suitably no external cooling. The reactor outlet stream removes the heat of polymerization from the reactor. The productivity of such adiabatic process can be improved by cooling the inlet solvent and/or monomer stream(s) prior to introduction into the reactor to permit a greater polymerization exotherm.

Thus the catalyst, cocatalyst and scavenger selections disclosed in this application can be advantageously practiced in a continuous, solution process operated at or above 80° C., to about 140° C. or up to less than about 200° C. Typically this process is conducted in an inert hydrocarbon solvent, linear, cyclic or branched aliphatic, or aromatic, at a pressure of from 20 to 200 bar. For both supercritical phase and high temperature solution polymerization, pre-contacting of the catalyst component in the substantial absence of organoaluminum compounds or in situ contacting in the presence of dilute amounts of organoaluminum compounds are highly preferred.

The invention catalysts ability to provide a commercially desirable polymer at elevated temperatures contributes to a yet greater exotherm, to high polymer contents in the reactor because of lower viscosity; and to reduced energy consumption in evaporating and recycling solvent, and better monomer and comonomer depletion.

In addition to the above, the high activity of the catalyst combination of the invention enables the highly efficient production of ethylene copolymers of lesser comonomer content by solution polymerization. Thus polyethylene copolymers having densities greater than or equal to 0.915 up to 0.930, including the traditional class of linear low density polyethylene (LLDPE), may be produced at high reaction solution temperatures, e.g., 120° C. to about 180° C. The comonomer incorporation capability and high temperature stability of the catalysts enable this industrially desirable polymerization characteristics of the invention process.

Preferred feedstock purification prior to introduction into the reaction processes follows standard practices in the art, e.g. molecular sieves, alumina beds and oxygen removal catalysts are used for the purification of ethylene and α-olefin. The solvents as well, e.g., hexane and toluene, can be similarly treated. Purification of the dienes is also preferred in order to increase diene conversion, e.g., when the diene is fractionally distilled with $CaH_2$ as the purification agent or purified over mole sieves and alumina.

The α-olefin monomer(s) and diene monomer(s), if included, are introduced into the polymerization reactor or reactors in amounts proportional to the levels of incorporation desired for the polymer to be produced and the effective reactive ratios for the polymerizable monomers in the presence of the specific catalyst chosen at the temperature of operation.

The catalyst activator, that is the non-coordinating anion precursor, or ionizing anionic precursor can be introduced along with or separately from introduction of the optional diolefin monomer(s), if used. The diolefin can be provided in an amount effective for its rate of reaction and rate of conversion. The catalyst activator can be provided in an amount that is equal to 0.2 to 5 molar equivalents of the metallocene compound, preferably 0.25 to 3.0, most preferably 1:1. Typically the provision of the noncoordinating anion precursor activator will be in an effective solvent, typically an aromatic solvent such as toluene or as a slurry in aliphatic solvent.

In a preferred embodiment the metallocene compound is contacted with the activator prior to addition to the polymerizable monomers so as to eliminate or limit the residence time of the scavenging compound (present with the monomers) with the activator. The metallocene is typically provided in an aliphatic or aromatic solvent, which can be any of those suitable as polymerization medium. Though any order of activation will have at least some suitability, the order of addition described herein is particularly suitable for use with ionizing activators that provide the stabilized metallocene cation-noncoordinating anion pair. In this manner premature activation can be avoided.

Ethylene is then provided into the reaction vessel in an amount proportional to the level of incorporation desired and the effective reactivity ratios for the polymerizable monomers in the presence of the specific catalyst chosen, as with the α-olefin monomer(s). The polymerization commences upon contact of the monomers with the activated catalyst and the rates of provision of each of the components of the system are adjusted for stable operations at the level of production, molecular weight, monomer incorporation and equipment limitations. The reaction temperature may be permitted to exceed the initial temperature but will preferably be at all times greater than the lower limit of the ranges described above for the invention process.

The solvents for the polymerization reaction will comprise those known for solution polymerization, typically the aliphatic solvents represented by hexane, or the aromatic solvents, represented by toluene. Additional examples include heptane, cyclohexane, and Isopar® E ($C_8$ to $C_{12}$ aliphatic solvent, Exxon Chemical Co., U.S. Preferably the solvent is aliphatic, most preferably it is hexane.

Though the Examples and the discussion are directed to a single reactor configuration and narrow polydispersity polymers, it is well-known that the use in series of two or more such reactors each operated so as to achieve different polymer molecular weight characteristics, or by blending polymers from different reactor conditions, can yield improved processing polymers. The disclosures of U.S. Pat. No. 4,722,971 and WO 93/21270 are instructive and are incorporated for purposes of U.S. patent practice. Though directed to the use of vanadium catalysts, the substitution of the metallocene catalyst systems of this invention into one such reactor, or two different catalysts into two such reactors, or similar use in two separate polymerizations with subsequent physical blending of the polymer products, will permit tailoring of characteristics (e.g., molecular weights and diene contents) suitable for balancing vulcanization properties with processability. Similarly, the use of mixed catalyst systems, the invention catalysts with themselves or with others, in one or more such reactors will permit preparation of bimodal or multimodal ethylene polymers having improved processing properties. Additionally, use of series reactors also allows increase of diene conversions to levels comparable to the knowledge in art with respect to EPDM polymerization with vanadium catalysts.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. The polymer products exemplified below were characterized by Mooney viscosity (Mooney Viscometer, ASTM D 1648), ethylene content (Fourier Transform Infrared Spectroscopy (FTIR), ASTM D 3900), number-average molecular weight (gel permeation chromatography/differential refractive index (GPC/DRI)) and weight-average molecular weight (low angle laser light scattering (Lalls). The molecular weight and composition measurements are described in G. Ver Strate, C. Cozewith, S. Ju, *Macromolecules,* 21, 3360 (1988). See also G. Ver Strate, "Structure Characterization", The Science and Technology of Elastomers, Ch. 3 (Academic Press, 1978) and U.S. Pat. No. 4,989,436 (where similar methods are used and described).

EXAMPLES

Polymerization Procedure (Single Reactor)

Polymerizations were carried out in one, one-liter stirred reactor with continuous flow of feeds to the system and continuous withdrawal of products. The hexane solvent and monomers were purified over beds of alumina and mole sieves. Toluene for preparing catalyst solutions was also purified by the same technique. All feeds were pumped into the reactors by metering pumps except for the ethylene (and hydrogen where applicable) which flowed as a gas under its own pressure through a mass flow meter/controller. Reactor temperature was controlled by circulating water through a reactor cooling jacket. The reactors were maintained at a pressure in excess of the vapor pressure of the reactant mixture to keep the reactants in the liquid phase. The reactors were operated liquid full.

Ethylene and propylene feeds were combined into one stream and then mixed with a prechilled hexane stream that had been cooled to 0° C. A hexane solution of triisobutyl aluminum scavenger was added to the combined solvent and monomer stream just before it entered the reactor to further reduce the concentration of any catalyst poisons. The catalyst components in solvent (usually toluene or toluene/hexane mixtures) were pumped separately to the reactor and, in most cases activated in-line just prior to the reactor, then the activated catalyst entered the reactor through a separate port outfitted with a dip tube to ensure adequate distribution. The polymer/solvent/unconverted monomers, and catalyst solution exits the first reactor through a pressure control valve that reduced the pressure to atmospheric. This caused the unconverted monomers in the solution to flash into a vapor phase which was vented from the top of a vapor-liquid separator. The liquid phase, including, for the most part, polymer and solvent, flowed out the bottom of the separator and was collected for polymer recovery. After removing a small portion for determining cement concentration, stabilizer was added to the polymer solution. The stabilized polymer was recovered from solution by either steam stripping followed by vacuum drying, or by solvent evaporation over heat and vacuum drying. Specific conditions and results are presented in the following tables.

The catalyst were prepared with the following compounds.

| Catalyst | Metallocene Compound |
|---|---|
| Example 1 | Dimethylsilyl bis(indenyl) hafnium dimethyl |
| Example 2 | Diphenylmethylene (cyclopentadienyl)(fluorenyl) hafnium dimethyl |
| Cocatalyst | CoCatlayst ActivatorCompound |
| A(comp) | [N,N-dimethylanilinium hydride] [tetrakis(pentafluorophenyl) boron] |
| B | [N,N-dimethylanilinium hydride] [tetrakis(heptafluoronapthyl) boron] |

Example 1

Polymerizations were run as generally indicated above under the specific conditions shown with the metallocene dimethylsilyl bis(indenyl) hafnium dimethyl and the activators A and B described.

TABLE I(a)

Polymerization Conditions

| Ex. | CoCat. Act. | Monomer Feed (g/hr) $C_2$ | $C_3$ | Cat. Feed (g/hr) | Scav/Cat (mol/mol) | Residence time (min) | Monomer Conversion (%) $C_2$ | $C_3$ |
|---|---|---|---|---|---|---|---|---|
| 1-1 | A(c) | 102 | 237 | 0.00906 | 21.36 | 10.77 | 91.4 | 76.0 |
| 1-2 | B | 102 | 276 | 0.00906 | 21.36 | 10.52 | 92.5 | 67.3 |
| 1-3 | B | 19.8 | 405 | 0.00906 | 21.36 | 9.96 | >90 | 57.7 |
| 1-4 | B | 102 | 240 | 0.00793 | 18.29 | 10.68 | 91.0 | 75.5 |
| 1-5 | B | 156 | 126 | 0.00793 | 18.29 | 10.69 | 99.4 | 79.1 |

Notes: All examples were run with dimethylsilyl bis(indenyl) hafnium dimethyl at 80° C.

TABLE I(b)

Polymerization Results and Product Characterization

| Ex. | Comp. (wt % $C_2$) | Mooney Viscosity (125° C.) | Cat. Eff. (g-pol/g-cat) | $C_2$ Conv. (%) | $C_3$ Conv. (%) | Mn × $10^{-3}$ (DRI) | Mw × $10^{-3}$ (Lalls) | MWD (Lalls/DRI) |
|---|---|---|---|---|---|---|---|---|
| 1-1(c) | 34.1 | * | 30,172 | 91.4 | 76.0 | 32.6 | 60.1 | 1.84 |
| 1-2 | 33.7 | 12.9 | 30,927 | 92.5 | 67.3 | 65.8 | 138.3 | 2.10 |
| 1-3 | 9.6 | 3.1 | 28,510 | >90 | 57.7 | 69.6 | 143.3 | 2.05 |
| 1-4 | 33.9 | 14.6 | 34,566 | 91.0 | 75.5 | 72.7 | 140.6 | 1.93 |
| 1-5 | 60.9 | 64.9 | 32,134 | 99.4 | 79.1 | 94.6 | 221.5 | 2.34 |

Notes: *too low for measurement;

Comparing Examples 1–2 and 14 with 1—1 (comparative) illustrates a clear increase in molecular weight using cocatalyst B over cocatalyst A under the conditions described. Mooney viscosity increased from a value too low to measure to 12.9 and this increase is confirmed by GPC. Surprisingly, cocatalyst B provided over twice the molecular weight at similar ethylene conversions and catalyst efficiencies.

Example 1–3 conditions yielded a 10% $C_2$ copolymer with a 3.1 Mooney. This high molecular weight product, having 90% propylene in largely isospecific orientation, was a particularly surprising result in view of early work with isospecific catalysts when high amounts of propylene were used, relative to ethylene.

Example 2

Cocatalyst B Evaluation With Syndiospecific Catalyst

A similar set of comparison examples were run with the metallocene diphenylmethylene (cyclopentadienyl) (fluorenyl) hafnium dimethyl.

TABLE II(a)

Polymerization conditions

| Ex. | CoCat. Act. | Monomer Feed (g/hr) $C_2$ | $C_3$ | Temp (° C.) | Cat Feed (g/hr) | Scav/Cat (mol/mol) | Residence time (min) |
|---|---|---|---|---|---|---|---|
| 2-1(c) | A(c) | 102 | 240 | 110 | 0.011 | 18.59 | 10.24 |
| 2-2 | B | 102 | 276 | 110 | 0.00631 | 26.83 | 11.33 |
| 2-3 | A(c) | 156 | 130 | 110 | 0.00422 | 18.6 | 10.78 |
| 2-4 | B | 156 | 126 | 110 | 0.00631 | 26.83 | 11.87 |
| 2-5(c) | A(c) | 156 | 165 | 100 | 0.00863 | 19.09 | 9.79 |
| 2-6 | B | 156 | 192 | 101 | 0.00631 | 26.83 | 11.71 |
| 2-7 | B | 30 | 405 | 110 | 0.00631 | 26.83 | 11.44 |

TABLE II(b)

Polymerization Results and Product Characterization

| Ex. | C₂ (wt %) (FTIR) | Mn (× 10⁻³) (DRI) | Mw (× 10⁻³) (Lalls) | Mooney @ 125° C. | Monomer Conversion (%) | | Cat. Eff. (g-pol/g-cat) |
|---|---|---|---|---|---|---|---|
| | | | | | C₂ | C₃ | |
| 2-1(c) | 42.5 | 66.6 | 123.2 | 7.8 | 77 | 44 | 21,900 |
| 2-2 | 42.8 | 108.9 | 222.5 | 79.8 | 58 | 29 | 21,900 |
| 2-3(c) | 67.1 | 93.2 | 181.4 | 40.5 | 80 | 42 | 44,200 |
| 2-4 | 64.5 | 152.4 | 300.0 | 130.6 | 58 | 40 | 22,300 |
| 2-5(c) | 57.7 | 88.0 | 164.5 | 41.2 | 83 | 58 | 26,000 |
| 2-6 | 56.9 | 158.4 | 312.3 | 141.4 | 67 | 41 | 29,100 |
| 2-7 | 16.4 | 107.3 | 203.2 | 37.9 | 66 | 25 | 19,200 |

As shown above diphenylmethylene (cyclopentadienyl)(fluorenyl) hafnium dimethyl activated with [N,N-dimethylanilinium hydride] tetrakis (heptafluoronapthyl) boron] ("B") showed a distinct improvement in molecular weight over the same activated with [N,N-dimethylanilinium hydride] [tetrakis (perfluorophenyl) boron] ("A"). At about 40% ethylene composition, the invention catalyst (2—2) made 222,500 Mw compared to 123,200 Mw for 2-1(c). Some of the increase in molecular weight is the result of lower ethylene conversion (58 v. 77%), but the 25% drop in conversion can not explain the over 80% increase in molecular weight. This increase is the result of the invention catalyst. Similar results are seen at about 57% ethylene conversion (2-5(c) vs. 2-6) and at 67% ethylene conversion (2-3 (c) vs. 2-4). In every example the molecular weight almost doubled with only small differences in ethylene conversion. Additionally, even at 16.4 wt % ethylene (2-7), that is high comonomer content (~85 wt %) the invention catalyst made higher number-average and weight average molecular weight polymer than the comparative catalyst. The changes in molecular weights are confirmed generally by the measured increase in Mooney viscosity.

We claim:

1. A polymerization process for ethylene copolymers having a density less than 0.915 comprising contacting ethylene, one or more α-olefin monomer, and optionally one or more diene monomer, with a catalyst composition comprising the reaction product of at least one organometallic Group 4 metallocene compound derived from a bridged, fused-ring ligand containing biscyclopentadienyl hafnocene, said bridge being a substituted or unsubstituted carbon or silicon atom connecting tie biscyclopentadienyl ligands, and a salt of a Group 13 element anionic complex having halogenated aromatic ligands in an essentially tetrahedral structure wherein the aromatic groups are polycyclic fused or polycyclic pendant aromatic rings.

2. The process of claim 1 wherein said contacting is conducted in the presence of an amount of organoaluminum scavenging compound such that the aluminum to hafnium molar ratio is less than 100:1.

3. The process of claim 1 wherein said contacting is conducted in the presence of an amount of organoaluminum scavenging compound such that the aluminum to hafnium molar ratio is less than 25:1.

4. The process of claim 3 comprising:
   a) contacting said hafnium compound with said salt in the substantial absence of alkyl aluminum compounds;
   b) adding to a suitable polymerization medium the reaction product of a), said polymerization medium comprising the ethylene, one or more α-olefin monomer and, optionally, one or more diene monomer, and said scavenging compound.

5. The process of claim 2 comprising contacting said hafnium compound with said activating salt in the presence of the polymerizable monomers in a reaction medium such that said organoaluminum compound is present in a molar ratio of aluminum to hafnium is less than or equal to 30:1.

6. The process of claim 1 wherein said ethylene copolymers have a density less than 0.900.

7. The process of claim 1 wherein said ethylene copolymers have a density less than 0.880.

8. The process of claim 7 wherein said ethylene copolymers have number average weight of greater than 60,000.

9. The process of claim 8 wherein said ethylene copolymers have an α-olefin content greater than 10 mol %.

10. The process of claim 1 wherein said biscyclopentadienyl hafnocene is one having a substituted or unsubstituted fluorenyl ligand, an unsubstituted cyclopentadienyl ligand with an aryl-group substituted covalent bridging Group 14 atom between the ligands.

11. The process of claim 1 wherein the biscyclopentadienyl hafnocene is stereorigid and chiral and makes isotactic polypropylene.

12. The process of claim 1 wherein the biscyclopentadienyl hafnocene is stereorigid and chiral and makes syndiotactic polypropylene.

13. The process of claim 10 wherein said hafnium compound is selected from the group consisting of diphenyl methylene (cyclopentadienyl)(9-fluorenyl) hafnium dimethyl, diphenyl methylene (cyclopentadienyl)(2,7-dimethyl-9-fluorenyl) hafnium dimethyl and diphenyl methylene (cyclopentadienyl)(2,7-di-tert-butyl-9-fluorenyl) hafnium dimethyl.

14. The process of claim 1 wherein said cocatalyst precursor compound comprises a substituted nitrogen or carbon-containing cation.

15. The process of claim 1 wherein said polymerization process is a continuous polymerization process conducted in a continuous flow, stirred tank reactor or two or more continuous flow, stirred tank reactors conducted in series.

16. The process of claim 15 wherein the reaction temperature is in a range of about 40° C. to ≦140° C.

17. The process of claim 16 wherein said one or more α-olefin monomer is selected from the group consisting of propylene, 1-butene, 1-hexene, and 1-octene.

18. The process of claim 17 wherein one or more diene monomer is additionally copolymerized.

19. The process of claim 16 wherein said α-olefin monomer is propylene.

* * * * *